(12) United States Patent
Geigel (10) Patent No.: US 10,949,259 B2
(45) Date of Patent: Mar. 16, 2021

(54) SYSTEM AND METHOD OF SCHEDULING AND COMPUTING RESOURCE ALLOCATION OPTIMIZATION OF MACHINE LEARNING FLOWS

(71) Applicant: Atlantic Technical Organization, San Juan, PR (US)

(72) Inventor: Arturo Geigel, San Juan, PR (US)

(*) Notice: Subject to any disclaimer, the term of this patent is extended or adjusted under 35 U.S.C. 154(b) by 102 days.

(21) Appl. No.: 16/235,456

(22) Filed: Dec. 28, 2018

(65) Prior Publication Data
US 2020/0210239 A1 Jul. 2, 2020

(51) Int. Cl.
*G06F 9/50* (2006.01)
*G06N 20/00* (2019.01)

(52) U.S. Cl.
CPC .......... *G06F 9/50* (2013.01); *G06F 9/505* (2013.01); *G06F 9/5016* (2013.01); *G06F 9/5038* (2013.01); *G06F 9/5044* (2013.01); *G06N 20/00* (2019.01)

(58) Field of Classification Search
None
See application file for complete search history.

(56) References Cited

U.S. PATENT DOCUMENTS

| 2012/0233609 | A1* | 9/2012 | Blythe | G06F 11/3419 |
| | | | | 718/1 |
| 2016/0098292 | A1* | 4/2016 | Boutin | G06F 9/505 |
| | | | | 718/104 |
| 2018/0329740 | A1 | 11/2018 | Geigel | |
| 2019/0114260 | A1* | 4/2019 | Cho | G06F 3/061 |
| 2020/0082273 | A1* | 3/2020 | Rossi | G06N 3/10 |

OTHER PUBLICATIONS

U.S. Appl. No. 16/235,591 (not published yet)—Specification, Claims, Abstract and Drawings attached.

* cited by examiner

*Primary Examiner* — Lewis A Bullock, Jr.
*Assistant Examiner* — Mark A Gooray
(74) *Attorney, Agent, or Firm* — Eugenio J. Torres-Oyola; Victor M. Rodriguez-Reyes; Ferraiuoli LLC (57) ABSTRACT

A distributed machine learning optimization flow processing engine is proposed. The processing engine takes into account the structure of the programming to assign proper allocation within a distributed computing infrastructure. The processing engine also takes into account availability and loads of the different computing elements within the distributed infrastructure to maximize their utilization according to the software being executed.

10 Claims, 9 Drawing Sheets

FIG. 9

SYSTEM AND METHOD OF SCHEDULING AND COMPUTING RESOURCE ALLOCATION OPTIMIZATION OF MACHINE LEARNING FLOWS

STATEMENT REGARDING FEDERALLY SPONSORED RESEARCH AND DEVELOPMENT

N/A

RELATED APPLICATIONS

N/A

BACKGROUND OF THE INVENTION

Field of the Invention

The present invention relates to the field of parallel execution. More specifically to execution of distributed machine learning tasks and the use of an execution graph to determine the parallel execution environment of the individual tasks.

SUMMARY OF THE INVENTION

The field of machine learning usually involves algorithms that have a running complexity that demands ever higher computational power. While efforts are being made every day to optimize the realm of machine learning it is still in need of substantial amounts of processing power. This processing power comes in the form of architectures that leverage different forms distributed computation. Distributed computing on the other hand develops under blind assumptions of the programs that they must execute. This blind development/execution assumption is adopted under the premise of generalization at the expense of optimal execution. Limitations of the field are that current implementations do not bridge the gap between the higher level conceptualizations in programming how they are executed when faced with multiple jobs and the low level scheduling at the parallel (multiple systems, multiple processors/GPUs, multiple I/O and memory mapping).

The blind development/execution assumption under the machine learning field provides several drawbacks. First is that most operations can be defined as repetitive on distinct pieces of data. While some of this problem is addressed by SIMD paradigm, the assumption is with respect to a single time slice and not throughout the lifetime of the algorithm. For example the processing of a neural network doing batch processing will make one epoch and repeat the epoch again on the same data. This can lead to stable prediction of execution that is not being done by the current paradigms.

The blind development/execution assumption on heterogeneous platforms can lead to mistreatment of the executing code with sub optimal performance characteristics. Not taking into account multiple executing code segments and their long term correlations can lead to resource contention. Resource contention is basically managed at different level but mainly through operating system scheduling. The problem again arises on such scheduling algorithms that underlying process assumptions are not being taken into account for maximal optimization. An overlooked assumption on machine learning processes is that the process will be a long running process with respect to CPU time. What this means is that the opportunity to optimize at the beginning of a predictable process is not being done. While optimization at the macro level might involve optimization overhead, the expectation is that such time in relation to the long running nature of the process is enough to warrant such overhead and this is being ignored by the current state of the art.

DETAILED DESCRIPTION OF THE PREFERRED EMBODIMENT

Figure 1:
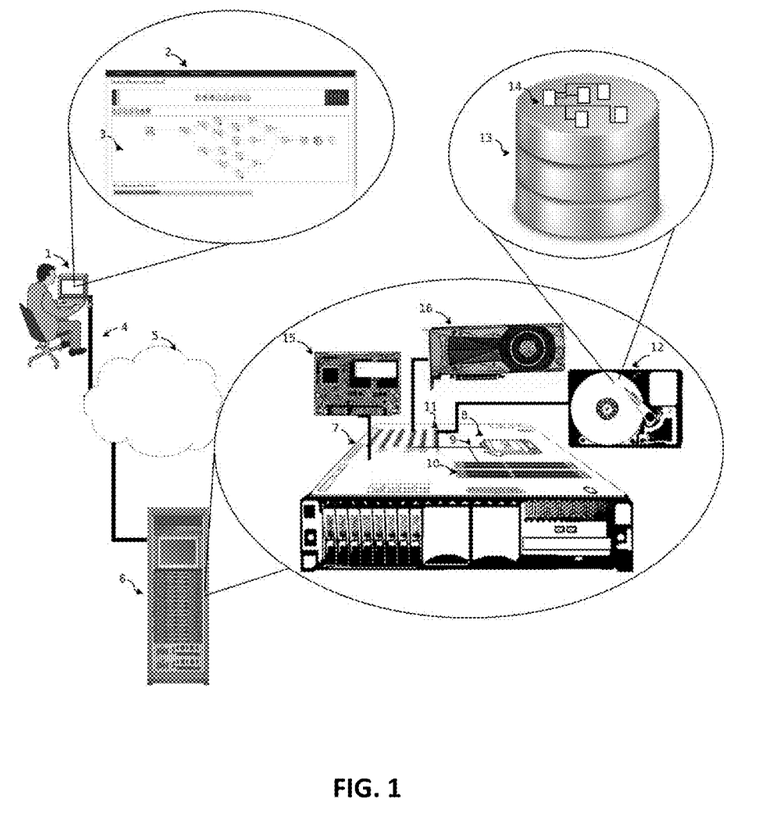
FIG. 1 shows a typical embodiment of the actual system that performs the functions of the proposed invention.

FIG. 1 presents a depiction of the overall system of an embodiment of the proposed system where a person utilizes a computer system 1 to interact with an application interface 2. The application interface 2 may completely or partially reside on the computer system 1. The application interface 2 provides a graphical representation of a flow 3. Once the user finishes configuring the graphical representation of flow 3, the user can communicate through a communications line 4 to a remote location 5 that is a site that houses a server system 6. The communications line 4 is typically embodied to operate in a networked environment using logical connections to one or more remote computers, such as a remote server system 6. An alternate embodiment may forego the remote location in favor of being located locally close to the user in the same facility. The communications line 4 include a local area network (LAN) and a wide area network (WAN), but may also include other networks. Such networking environments are commonplace in offices, enterprise-wide computer networks, intranets and the Internet and is well known to those skilled in the arts. For example, in the subject matter of the present application, the computer system 1 may comprise the source machine from which data is being migrated, and the remote server system 6 may comprise the destination machine. Note however that source and destination machines need not be connected by a network or any other means, but instead, data may be migrated via any media capable of being written by the source platform and read by the destination platform or platforms. When used in a LAN or WLAN networking environment, the computer 1 is connected to the LAN through a network interface or adapter. When used in a WAN networking environment, the computer 1 typically includes a modem or other means for establishing communications over the WAN, such as the Internet. The modem, which may be internal or external, may be connected to the system bus via the user input interface or other appropriate mechanism. In a networked environment, program modules depicted relative to the computer 1, or portions thereof, may be stored in the remote memory storage device. By way of example, remote application programs may reside on memory device. It will be appreciated that the network connections shown are exemplary and other means of establishing a communications link between the computers may be used.

The server system 6 in its typical embodiment is made up of a server 7 or a plurality of them. The server system 7 typically consists of a CPU system 8 that connects to a bus 9. The bus 9 also connects to memory modules 10 and I/O device connector 11. I/o connector 11 connects to a storage disk 12. The storage disk 12 contains information about the program which is codified through a database storage application 13 into a data structure 14. The database storage application 13 and data structure 14 can also be stored in a solid state device 15 and instead of the information being processed in a cpu system 8 it can also be processed in a GPU 16. Somebody skilled in the art can easily recognize that additional substitution of storage elements can be utilized such as optical disk and tape backup technologies as well as other units such as multi-processor architectures to carry out the processing of the structures in the database.

Figure 2:
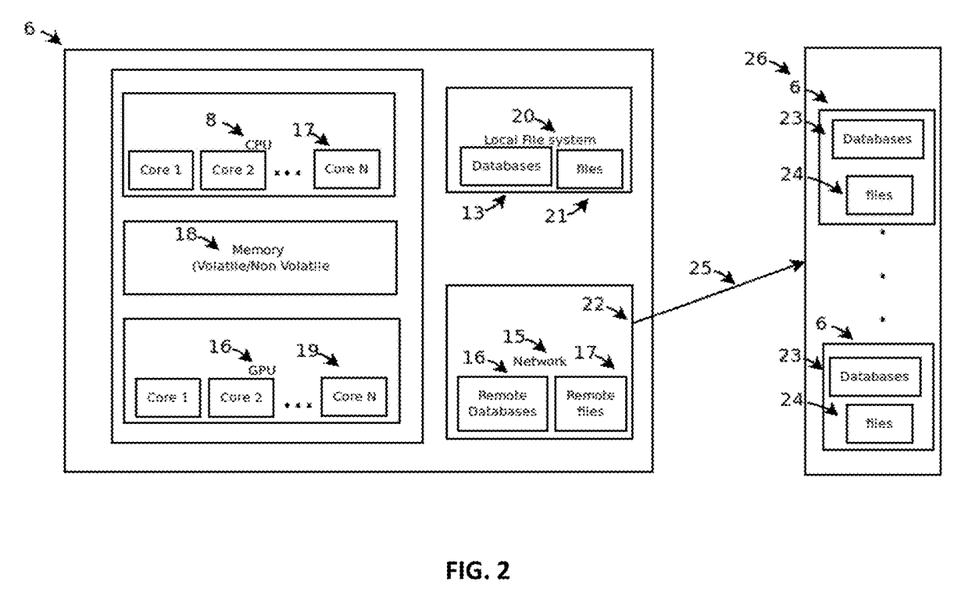
FIG. 2 describes the physical layout of the typical execution environment on which the parallel execution will take place.

FIG. 2 describes the physical layout of the typical execution environment on which the parallel execution will take place. A typical embodiment consists of a computer system 6 that contains a CPU 8 with a number of N cores 17. The n cores 17 is capable of doing multi-threading tasks on the CPU 8. The computer system 6 also contains a memory system 18 capable of storing information for processing by the CPU 8. The computer system 6 can also contain a compute capable GPU 16 with a number of N cores 19. Computer system 6 has a local file system 20 that can contain a number of files 21 and possible a database system 13. Computer system 6 includes a network interface 22 that is able to access a remote database system 23 or a remote file system 24. Access to remote database system 23 and/or a remote file system 24 is done through a network card in a network 22 via a connection 25 to a cloud infrastructure 26. The cloud infrastructure 26 contains up to n computer systems 6.

Figure 3:
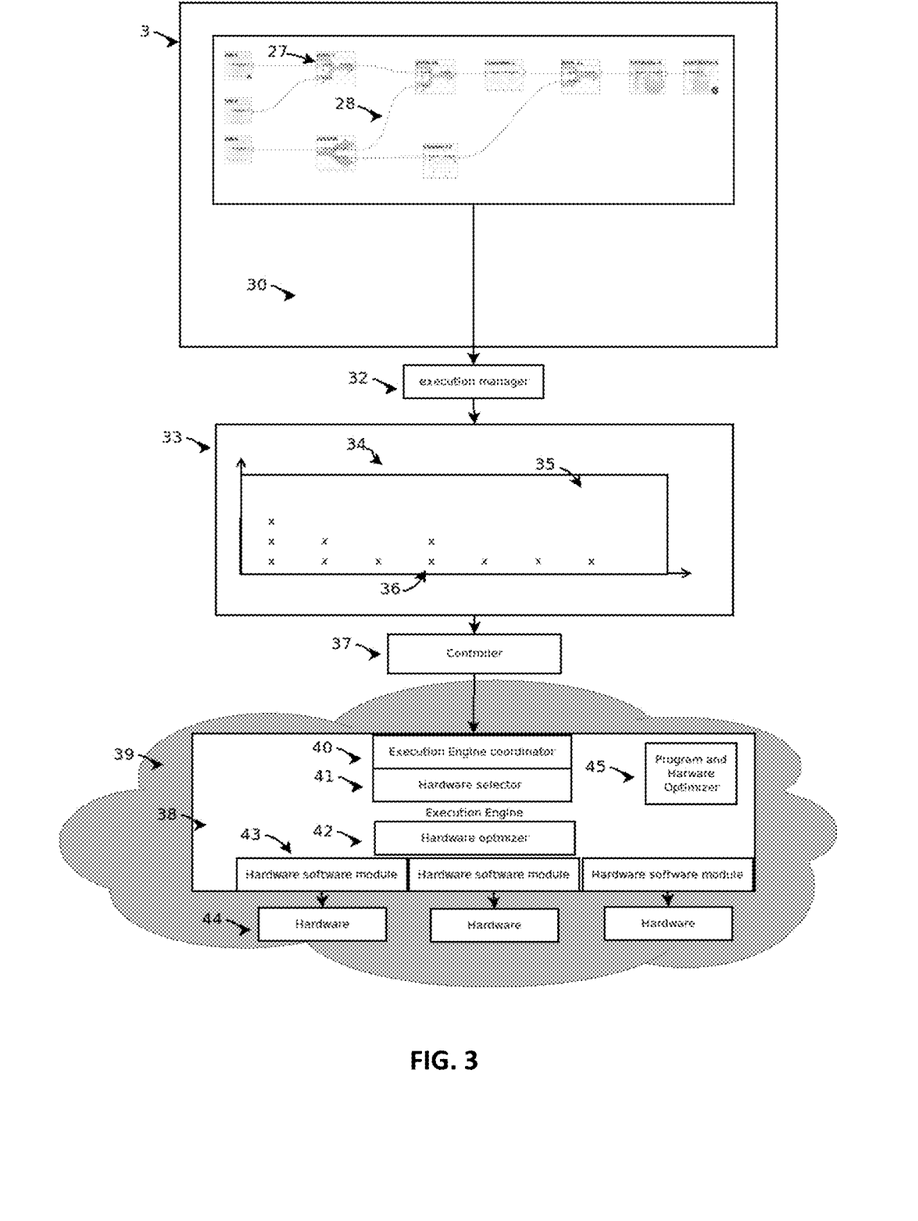
FIG. 3 displays a graphical representation of the major components of the proposed system

FIG. 3 displays a graphical representation of the major components of the proposed system that will process a generic designed flow. The system starts with the interface system 3 that has functionality icons 27 that have the configuration that the system will execute and are connected via a link 28 together to form an execution program 30. Once the execution program 30 is finished in its design the program will be forwarded to an execution manager 32. The execution manager 32 will reside on the remote server system 6. The execution manager 32 will produce an execution map 33 based on the execution program 30. The execution map 33 contains an execution matrix 34 that will store the order of the execution for the execution program 30. Each entry in the execution matrix 34 is assigned an execution slot 35 that can be filled with an execution entry 36 that corresponds to functionality icon 27. Once the execution map 33 is completed it is passed to a controller 37 that also resides on server remote system 6. The controller coordinates the execution with an execution engine 38 across the cloud environment 39. The cloud environment 39 represents the cloud infrastructure 26 that contains up to n computer systems 6. The controller 37 communicates to an execution engine coordinator 40 that resides on one of n remote server system 6 of cloud environment 39. The execution engine coordinator 40 uses a hardware selector 41 to discriminate which component of remote server system 6. For example, hardware selector 41 can choose between execution hardware including but not limited to CPU, GPU multithreading or other processing technology and hard drive, optical media or other storage medium. Once hardware selector 41 chooses the particular processing technology, the hardware selector 41 selects a hardware optimizer 42 which coordinates with a hardware software module 43 that contains the necessary routines to interact with a hardware 44. An alternate embodiment might also include a non-cloud environment where all components run on a single system and includes the specified components to run on a single system. Such alternate embodiment can be easily be conceived by someone skilled in the art from the already disclosed description. In addition, a program and hardware optimizer 45 interacts with the execution engine coordinator 40 and hardware optimizer 42 to obtain the best execution layout throughout the cloud environment 39 and its n computer systems 6.

Figure 4:
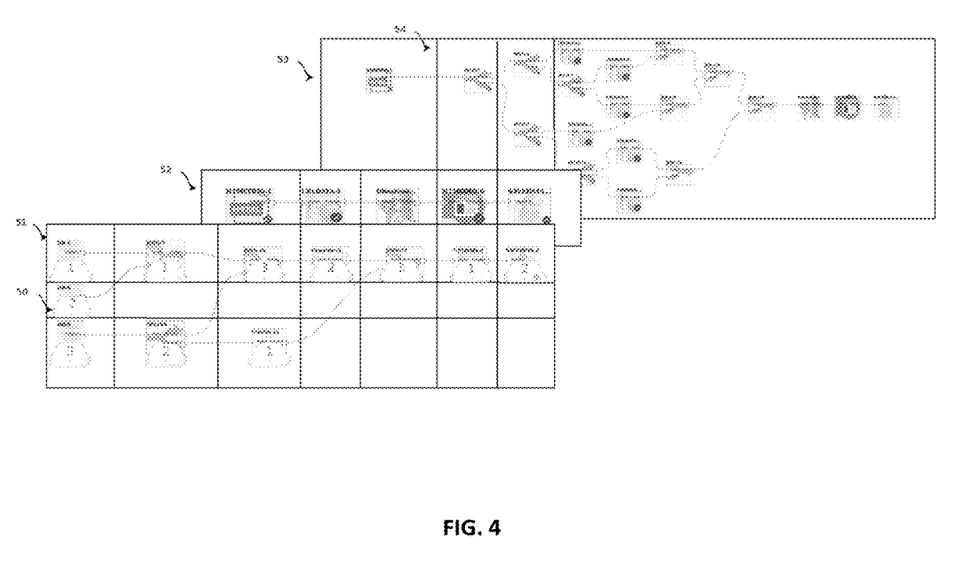
FIG. 4 shows the graphical representation of multiple concurrent model flows being overlaid for parallel execution optimization.

FIG. 4 shows the graphical representation of multiple concurrent model flows being overlaid for parallel execution optimization. An overlay of servers 50 is superimposed on functionality icons 27 on a flow 51. This overlay is also executed on a flow 52 and a flow 53 where a synchronization line 54 is representative of a column of execution slot 35 on execution matrix 34.

Figure 5:
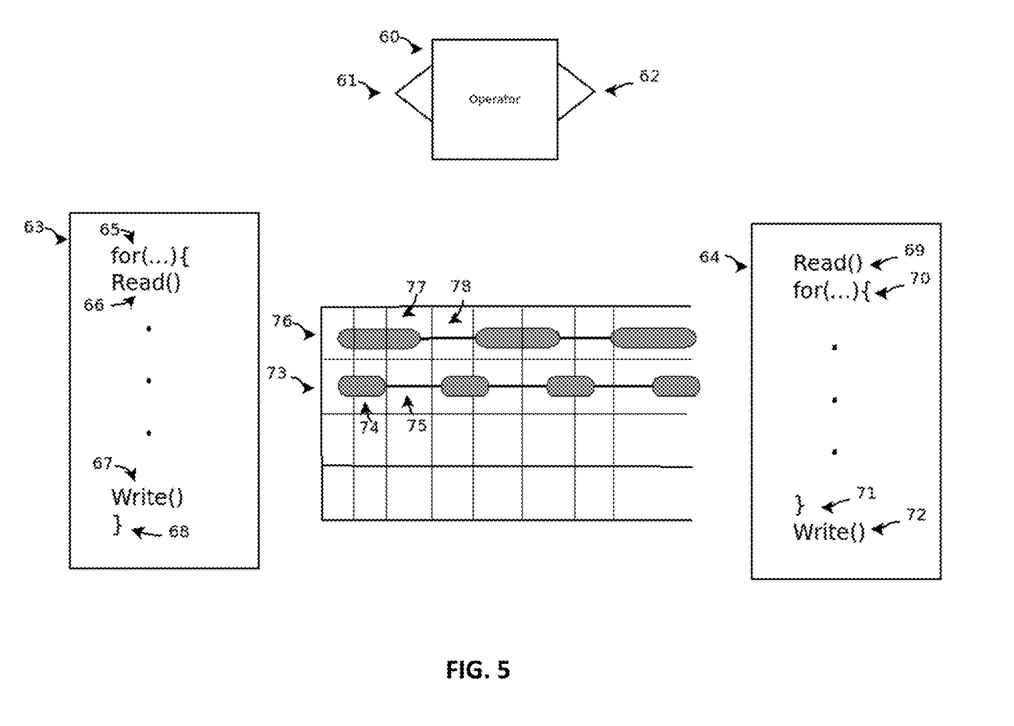
FIG. 5 shows a representation of a workflow operator, its pattern and how it executes on a CPU.

FIG. 5 shows a representation of a workflow operator, its pattern and how it executes on a CPU. Functionality icons 27 are treated as individual execution units represented as an operator 60. The operator 60 can have an input 61 and an output 62. Operators 60 can have more than one input 61 and output 62. When these operators 60 are implemented in a computing platform to process vector-based information, they are represented by either a pattern 63 or a pattern 64. pattern 63 takes the form of an iterative structure 65 where within its structure is a read operation 66, further instructions and a write operation 67. The closing of iterative structure is represented by a closing brace 68. This pattern 63 is commonly referred to as on line processing where the data is processed as it is received. Pattern 64 is contrasted to pattern 63 in that it contains a read instruction 69 followed by an iterative structure 70 followed by the rest of the programming instruction and a closing brace 71. The processed elements are written by a write instruction 72. The pattern 64 is known as a batch processing. Pattern 63 is represented in CPU terms as pipeline 73 having a small CPU burst 74 followed by an I/O interval 75 where it is waiting until the next CPU burst. Pattern 64 is represented in CPU terms as pipeline 76 having a bigger CPU burst 77 followed by an I/O interval 78 where it is waiting until the next CPU burst. The disclosed embodiment leverages that the operators 60 are integrated in the platform before use and their CPU bursts can also be accurately determined.

Figure 6:
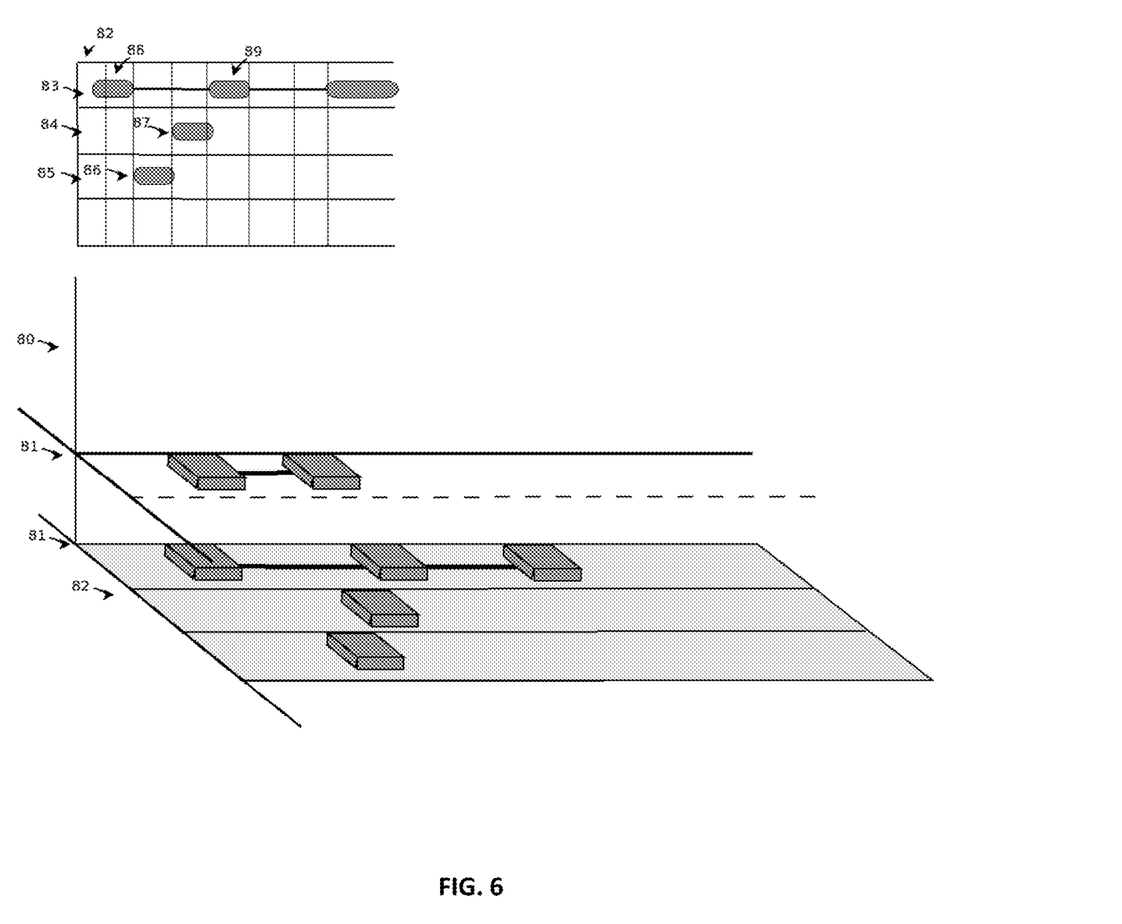
FIG. 6 shows a CPU pipeline and the processes on each of the cores.

FIG. 6 Shows a CPU pipeline and the processes on each of the cores. FIG. 6 shows a 3-dimensional rendering of a CPU structure 80. Each CPU structure 80 can have one or more core schedule representations 81. FIG. 6 also shows a core schedule instance 82 as part of the 3-dimensional rendering of a CPU structure 80 and its corresponding 2-dimensional representation. The core schedule instance 82 is composed of an operator programming pipeline 83, an operator programming pipeline 84 and an operator programming pipeline 85. The representation of FIG. 6 shows the ideal placement of a CPU burst 86 and a CPU burst 87 with respect to a CPU burst 88 and a CPU burst 89. The ideal placement of the CPU bursts allows for maximization of the core utilization based on the different operators patterns used in the platform. The representation of the embodiment here is not limited to single burst per process but also can be applied to superscalar and GPU architectures.

Figure 7:
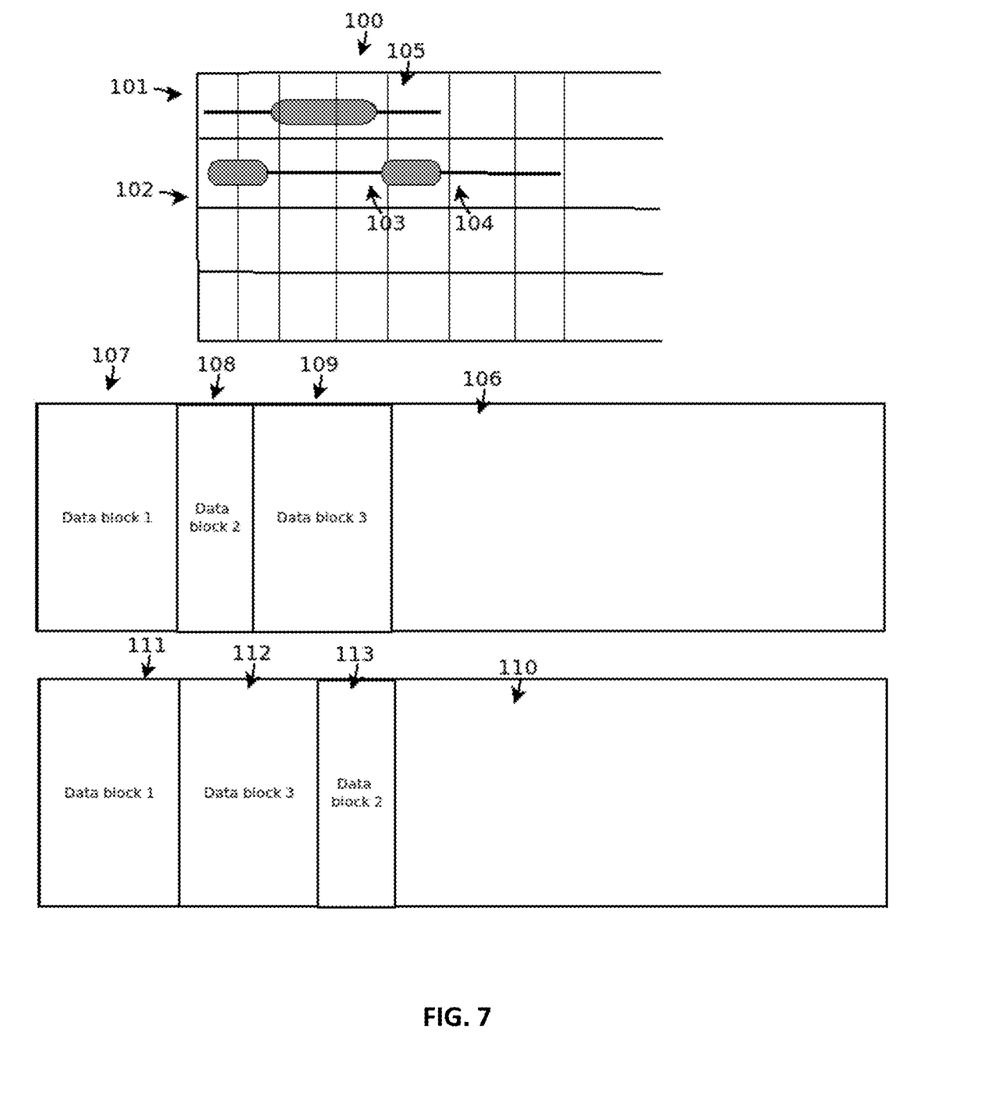
FIG. 7 shows the CPU bursts of a single core, its I/O interval and the corresponding desired and undesired data blocks placement for memory and block device.

FIG. 7 shows the CPU bursts of a single core, its I/O interval and the corresponding desired and undesired data blocks placement for memory and block device. FIG. 7 shows a core schedule instance 100 with a pipeline 101 and a pipeline 102. The pipeline 102 has an I/O interval 103 and an I/O interval 104. Pipeline 101 has an I/O interval 105. FIG. 7 shows a memory layout 106 considered optimal for the core schedule instance 100. A data block 107 corresponds to the read of I/O interval 103, a data block 108 corresponds to the writing of I/O interval 105, and a data block 109 corresponds to the writing of I/O interval 104. A memory layout 110 shows an unordered placement of a data block 111 corresponding to data block 107 a data block 112 corresponding to the misplaced data block 109 and a data block 113 corresponding to the misplaced block 108. The embodiment description here is also applicable for multi core analysis.

Figure 8:
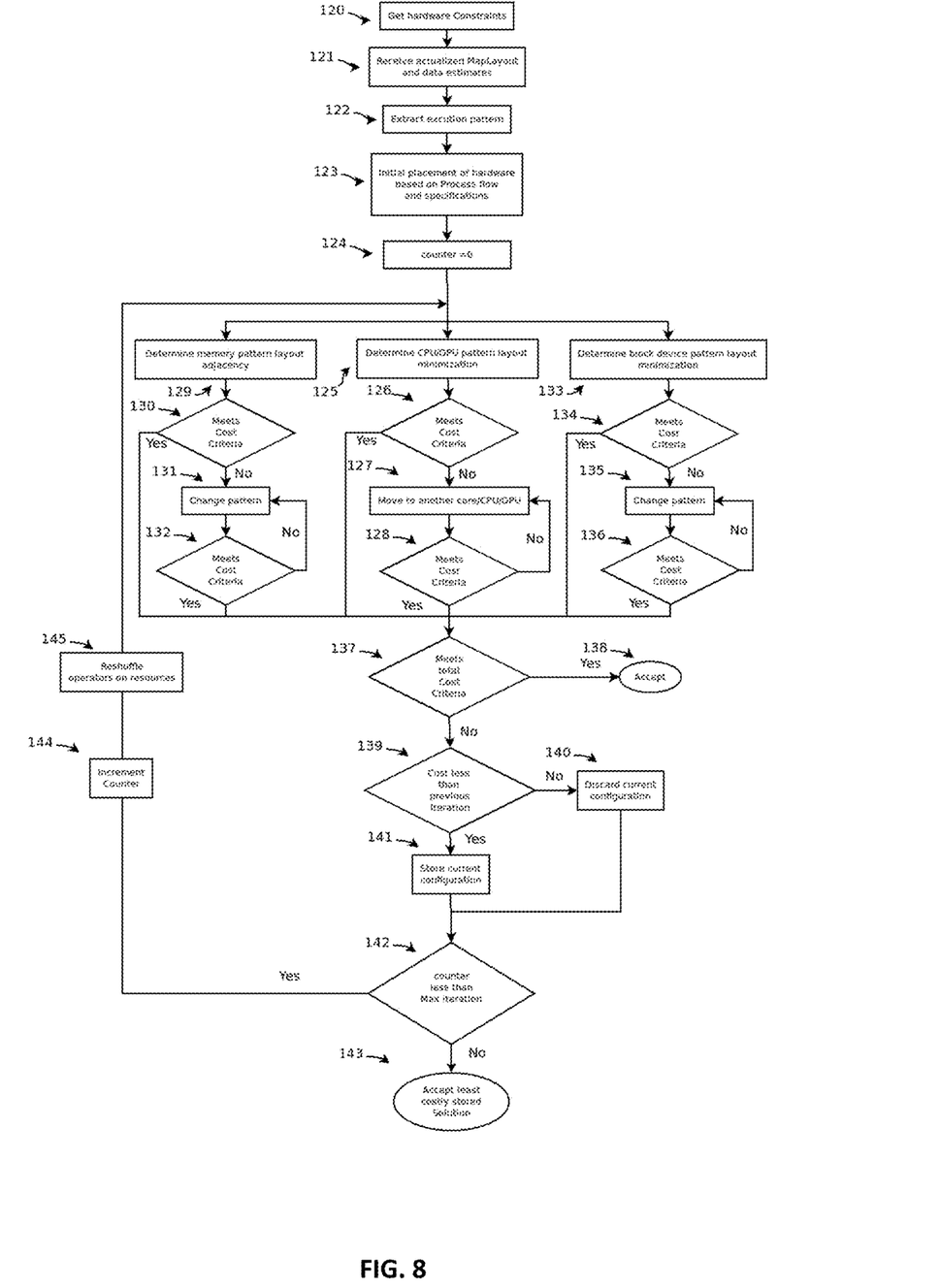
FIG. 8 shows a flowchart of the process of optimizing resource allocation per computing unit occurring in the program and hardware optimizer.

FIG. 8 shows a flowchart of the process of optimizing resource allocation per computing unit occurring in the program and hardware optimizer. The beginning of the process is initiated by a step 120 where the hardware constraints are acquired by the program hardware optimizer. Once the hardware constraints are acquired in step 120 a step 121 receives one or more of the execution matrix 34 representing the layouts for the flow 3. In addition, step 121 also receives the initial estimates for the data size. For example, databases contains restrictions on the maximum size of the column and these can be passed to the process operators to obtain the size of the vectors to be processed and these operators in turn can pass them to other operators. Alternatively these restrictions can be passed by other processes, network communications between operators or external sources streamed or in line. Additionally, this information can be used to estimate the sizes of data vectors for all operators according to the operations they carry out. Step 121 is followed by a step 122 where the execution pattern such as pattern 63 or pattern 64 is obtained. A step 123 follows step 122 where using the constraints based on the execution matrix 34 representing the layouts for the flow 3 is used to position the operator 60 and the hardware resources according to the flow of processing. Step 123 is followed by a step 124 where an optimization iteration counter is set to zero. Step 124 initializes the process of optimization which is started by a step 125 where the information from step 121, step 122 and step 123 are utilized to determine CPU bursts on individual cores and tries to minimize CPU overlap within cores. The step 125 is evaluated in a step 126. If step 126 provides negative results then it moves to a step 127 where the process is shifted among cores/CPUs/GPUs. Step 127 is evaluated by a step 128 where it is evaluated to meet the cost criteria or a predetermined number of iterations. If the number of iterations or cost criteria have not been met it is again moved to step 127 until it meets one of the two criteria. Parallel to step 125 is a step 129 that determines the memory layout of the process. Step 129 is executed alongside 125 since step 125 dictates the access to memory through CPU instructions. An example of this is the MOV instruction where the CPU is requesting a memory block. In a Uniform Memory Access (UMA) architecture this would imply taking into account all operator patterns executing across all cores to minimize cache loading patterns and minimize cache misses. In non-uniform memory access (NUMA) architectures the condition may be reduced to access patterns to each memory segment by the individual cores. Step 129 is evaluated by a step 130 to see if the memory layout meets the required cost criteria. The cost criteria will aim at minimizing cache misses and pre-fetching out of order. If the criteria of step 130 is not met, the process moves to a step 131 where the memory layout strategy is reconfigured. Step 131 is evaluated by a step 132 where it is evaluated to meet the cost criteria or a predetermined number of iterations. If the number of iterations have not been met or cost criteria it is again moved to step 131 until it meets one of the two criteria. Concurrently with step 125 and step 129 is a step 133 which determines the block device layout according to the writing reading pattern of the operator instruction pattern 63 or a pattern 64 according to the criteria shown in FIG. 7. The criteria also addresses the need to minimize the need for multiple hard disk passes on a sector as well as fragmentation on solid state devices. If the criteria of step 134 is not met, the process moves to a step 135 where the block device layout strategy is reconfigured. Step 135 is evaluated by a step 136 where it is evaluated to meet the cost criteria or a predetermined number of iterations. If the number of iterations have not been met or cost criteria it is again moved to step 135 until it meets one of the two criteria. When the individual criteria of step 132, step 128 and step 136 is met, step 137 evaluates the combined total cost to see if it meets the desired optimization criteria. If the criteria is met, then the process moves to a step 138 of acceptance. If the step 137 evaluates negatively then it moves to a step 139 to see if the cost of the current configuration is less than the cost of the previous configuration. If the step 139 is negative then it moves to discard the current configuration. If the step 139 output is positive then it stores the current configuration and its cost. Step 140 and 141 move to a step 142 where the counter is checked to see if it less than the established maximum number of iterations. If step 142 is negative then it moves to a step 143 that accepts the stored configuration which is the least costly solution that could be achieved that did not meet the required minimum but the number of iterations were exceeded. Step 142 can also output a positive value which then moves the process to a step 144 where the iteration counter is incremented. Step 144 is then followed by a step 145 where the operator's process is picked randomly or by a particular criteria of performance and is reassigned randomly to another resource. Step 145 then moves the process again to step 129, step 125 and step 133.

Figure 9:
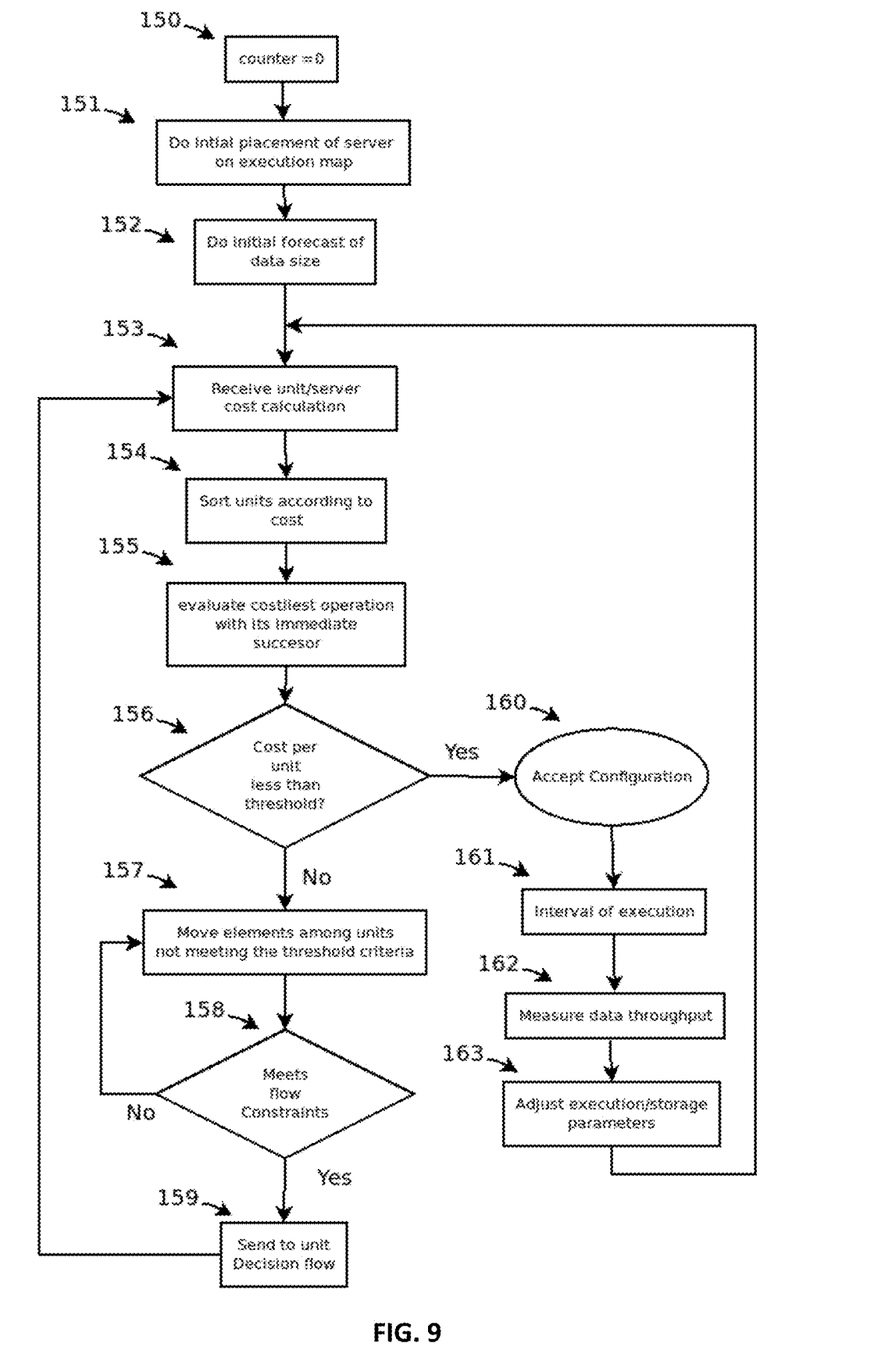
FIG. 9 shows a flowchart of the process occurring in the program and hardware optimizer to obtain the best execution across all computing units.

FIG. 9 shows a flowchart of the process occurring in the program and hardware optimizer to obtain the best execution across all computing units. The process begins with a step 150 that initializes a counter to zero. After the initialization of step 150 a step 151 does the initial placement of servers on the execution map as in FIG. 4. After step 151 a step 152 does an initial estimate of data size. For example, the estimate can be taken from the column specification of databases or other external means. After step 152 is completed a step 153 carries out the process described in FIG. 8 and receives the per unit costs computations. A step 154 sorts the costs received in step 153. As an additional embodiment detail, the cost can be taken as the value in the list, a relative value between costs or both criteria. The sorted costs of step 153 are then used to take the lowest costs in the sorted list. The selected costs from step 155 are then evaluated by a step 156. If the evaluation of step 156 is negative then a step 157 moves the elements among the units not meeting the threshold criteria. The movement can be randomly done or according to preselected criteria. The movement of step 157 is then corroborated by a step 158 that the movement does not violate the flow of execution order. If step 158 output is negative it will move again to step 157. If step 158 output is positive it will move to a step 159 where it is sent to the unit decision flow of FIG. 8 and move to step 153. If step 156 decision output is positive then the configuration is accepted in a step 160 and proceeds to step 161 which is to wait for an interval of execution. In this interval of execution is where the actual platform processes the information. For example, it can be a time slice of the execution map as provided in the x axis of the execution matrix 34 or sub execution time slice. Once the interval of execution terminates step 161 terminates and a step 162 retakes a measurement of the data estimates and throughput. After sampling the execution throughput and data parameters, the process moves to a step 163 where the execution storage parameters are updated in the process and sent again to the flow at step 153 to refine the process again.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed:

1. A method for computing resource allocation optimization for machine learning flows based on established hardware constraints in a single computing unit, comprising the steps of:
   receiving hardware constraints information from said computing unit, wherein said hardware constraints comprise a combination of memory constraints, processor constraints and block device constraints;
   establishing a maximum number of optimization iterations;
   establishing a hardware performance cost limit, wherein said hardware performance cost limit comprises a memory cost limit, a processor cost limit and a block device cost limit;
   receiving an execution matrix, wherein said execution matrix represents a process flow;
   receiving a plurality of data size estimates based on data to be processed by said process flow;
   determining an execution pattern, wherein said execution pattern comprises a plurality of operators that form said process flow;
   assigning hardware resources from said computing unit to the process flow represented by said execution matrix;
   determine a plurality of resource allocation configurations by performing the steps of:
   a) determining processor bursts and minimizing overlap within processor cores based on said processor constraints, said execution pattern, and said data size estimates, by assigning processor cores to said process flow that do not exceed said processor cost limit;
   b) determining memory pattern layout to minimize cache misses and pre-fetching out of order based on said memory constraints, said execution pattern, and said data size estimates, by assigning memory access to said process flow without exceeding said memory cost limit;
   c) determining block device pattern layout to minimize hard disk passes and fragmentation based on said block device constraints, said execution pattern, and said data size estimates, by assigning block device access to said process flow without exceeding said block device cost limit;
   d) iterating steps a through c for said maximum number of optimization iterations; and
   determining the resource allocation configuration with the lowest hardware performance cost from said plurality of resource allocation configurations.

2. The method as in claim 1, wherein said execution pattern comprises line processing.

3. The method as in claim 1, wherein said execution pattern comprises batch/online processing.

4. The method as in claim 1, wherein said data size estimates are received from database restrictions, network traffic other operators and processes.

5. The method as in claim 1, wherein said processor constraints comprise a plurality of CPUs, GPUs, or a combination of both.

6. A system for computing resource allocation optimization for machine learning flows based on established hardware constraints in a single computing unit, comprising:
   A computing unit comprising:
      at least one processor, wherein said at least one processor comprises processor constraints;
      at least one memory module, wherein said at least one memory module comprises memory constraints;
      at least one block device, wherein said at least one block device comprises block device constraints;
   an execution matrix, wherein said execution matrix represents a process flow;
   an optimizing module configured to:
      establish a maximum number of optimization iterations;
      establish a hardware performance cost limit, wherein said hardware performance cost limit comprises a memory cost limit, a processor cost limit and a block device cost limit;
      receive data size estimates based on data to be processed by said process flow;
      determine an execution pattern, wherein said execution pattern comprises a plurality of operators that form said process flow;
      assign hardware resources from said computing unit to the process flow represented by said execution matrix determine a plurality of resource allocation configurations by performing the steps of:
  a) determining processor bursts and minimizing overlap within processor cores based on said processor constraints, said execution pattern, and said data size estimates, by assigning processor cores to said process flow that do not exceed said processor cost limit;
  b) determining a memory pattern layout to minimize cache misses and pre-fetching out of order based on said memory constraints, said execution pattern, and said data size estimates, by assigning memory access to said process flow without exceeding said memory cost limit;
  c) determining a block device pattern layout to minimize hard disk passes and fragmentation based on said block device constraints, said execution pattern, and said data size estimates, by assigning block device access to said process flow without exceeding said block device cost limit;
  d) iterating steps a through c for said maximum number of optimization iterations; and
  determine the resource allocation configuration with the lowest hardware performance cost from said plurality of resource allocation configurations.

7. The system as in claim 6, wherein said execution pattern comprises line processing.

8. The system as in claim 6, wherein said execution pattern comprises batch processing.

9. The system as in claim 6, wherein said data size estimates are received from database restrictions.

10. The system as in claim 6, wherein said processor constraints comprise a plurality of CPUs, GPUs, or a combination of both.

* * * * *